(12) United States Patent
Garberg

(10) Patent No.: US 6,361,093 B2
(45) Date of Patent: Mar. 26, 2002

(54) WORK VEHICLE GRILLE SCREEN

(75) Inventor: Bryan J. Garberg, Moorhead, MN (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/330,483

(22) Filed: Jun. 11, 1999

(51) Int. Cl.⁷ .............................................. B60R 19/52
(52) U.S. Cl. ...................................... 293/115; 180/68.6
(58) Field of Search ......................... 293/115; 180/68.6

(56) References Cited

U.S. PATENT DOCUMENTS

| | | | |
|---|---|---|---|
| 86,930 A | 2/1869 | Jones | 246/435 R |
| 134,129 A | 12/1872 | Davis | 424/195.1 |
| D86,930 S | 5/1932 | Northup | D12/164 |
| 2,071,673 A | 2/1937 | Whitlock | 52/507 |
| D117,492 S * | 11/1939 | Cadwallader | 293/115 X |
| D134,129 S | 10/1942 | Block | D12/163 |
| 2,620,215 A * | 12/1952 | Luby | 293/115 |
| 2,779,620 A * | 1/1957 | Reed | 180/68.6 X |
| 2,796,141 A | 6/1957 | Schreiner | 180/68.6 |
| 3,792,889 A * | 2/1974 | Fuener et al. | 293/115 |
| 4,026,684 A * | 5/1977 | Finger | 55/126 |
| 4,143,732 A | 3/1979 | Schmude et al. | 180/68 P |
| 4,403,648 A | 9/1983 | Styok | 165/76 |
| 4,443,236 A | 4/1984 | Peiler | 55/269 |
| 4,753,468 A * | 6/1988 | Szymczak et al. | 180/68.6 X |
| 5,066,057 A * | 11/1991 | Furuta et al. | 293/121 |
| 5,205,597 A * | 4/1993 | Chase | 293/115 |
| 5,482,336 A * | 1/1996 | Rouse et al. | 293/115 |
| 5,503,444 A * | 4/1996 | Rouse et al. | 293/115 |
| 5,887,672 A * | 3/1999 | Kimura | 180/68.6 X |
| 6,105,349 A * | 8/2000 | Busboom et al. | 180/68.6 X |

FOREIGN PATENT DOCUMENTS

JP 0063545 * 4/1983 ............... 293/115

* cited by examiner

Primary Examiner—Stephen T. Gordon
Assistant Examiner—Lori L. Coletta
(74) Attorney, Agent, or Firm—Foley & Lardner

(57) ABSTRACT

An agricultural vehicle having a grille screen and a front end bumper is described herein. The bumper has a top surface and is disposed below the screen. The screen includes a plurality of convolutions having lower edges with open ends. Adjacent convolutions define intervening channels that provide a guided track on which impacting debris can move downwardly toward the lower edges to fall either on the ground or on the top surface of the bumper. The lower edges of the convolutions and the top surface of the bumpers are spaced apart by a gap sized to permit accumulated dirt and chaff to be wiped off the top surface of the bumper.

19 Claims, 2 Drawing Sheets

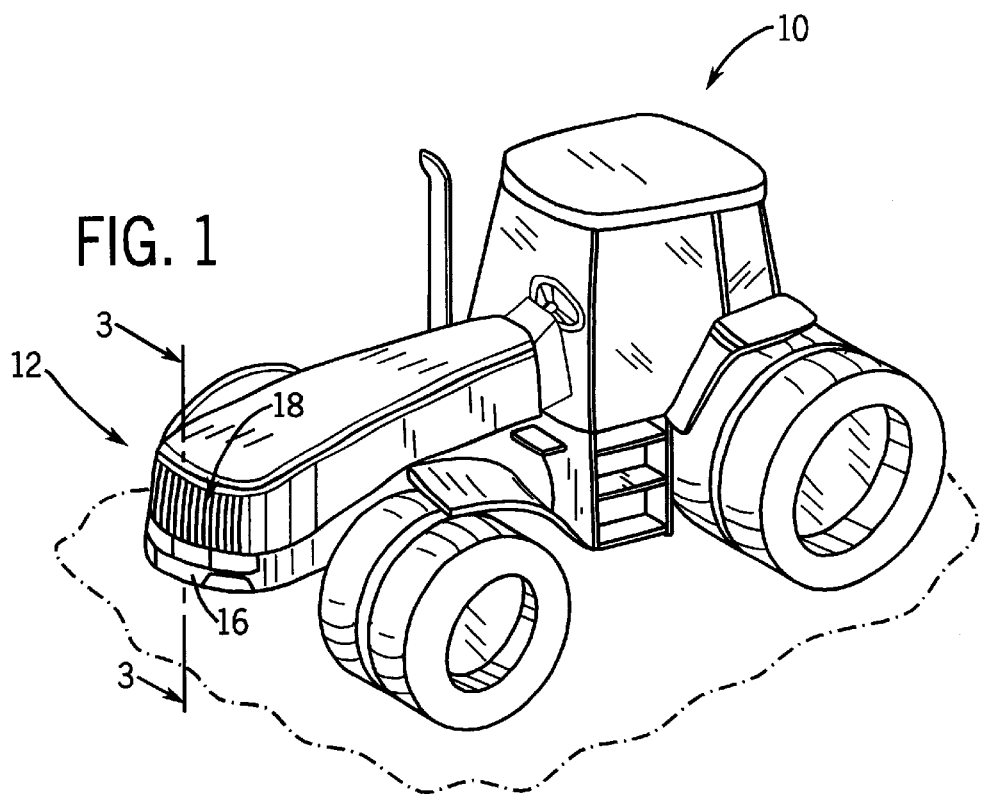
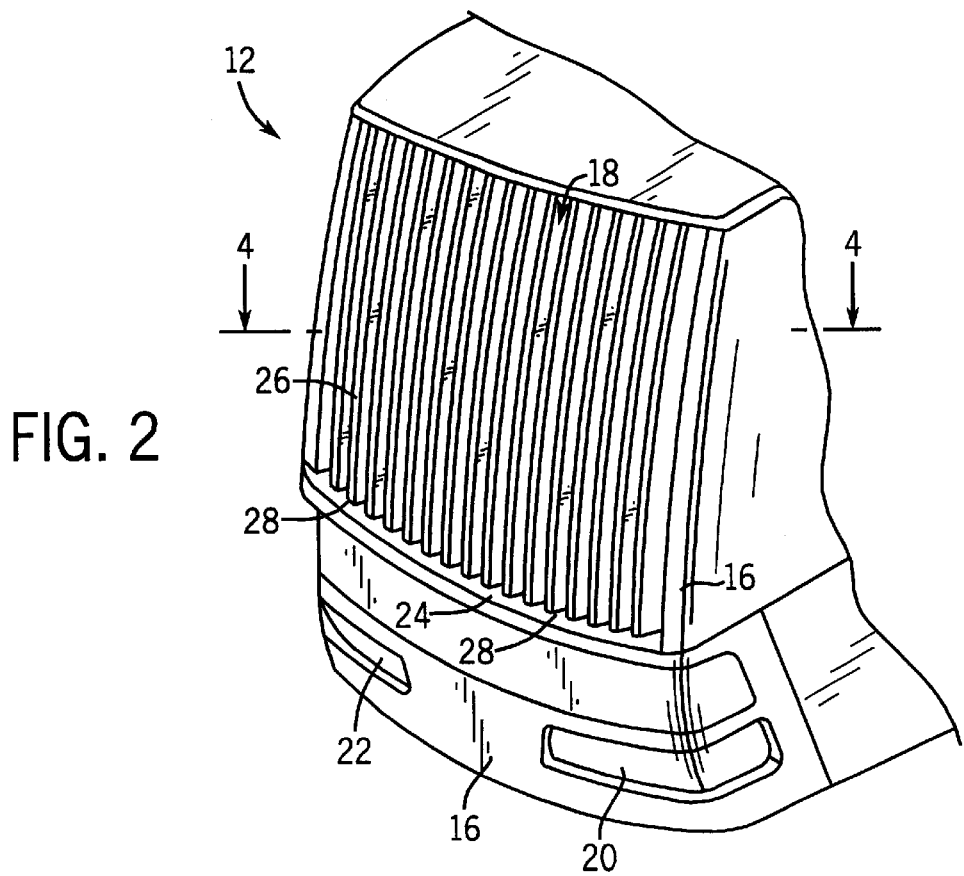

WORK VEHICLE GRILLE SCREEN

FIELD OF THE INVENTION

The present invention relates generally to a grille screen. More particularly, the present invention relates to an easy-cleaning grille screen for use on an agricultural or a construction vehicle.

BACKGROUND OF THE INVENTION

The advent of the motorized engine has revolutionized all aspects of production: industrial, commercial, and agricultural. For the agricultural sector, the use of motorized work vehicles provide practical, economic benefits. In particular, harvesting the fields was no longer totally dependent on manual labor. On the contrary, using engine-driven agricultural vehicles decreased manpower labor costs and provided the same harvest yield in comparatively much less time. As a result, using motorized agricultural vehicles, such as, tractors and other implements, has generally become a standard operating procedure for harvesting fields.

Since engines that run for a prolonged period of time tend to overheat, a primary cooling component, such as, a radiator, is usually associated with the engine. Conventionally, to protect the engine and the radiator from exposure to outside elements which may interfere with their respective performance, the motor compartment of a typical agricultural vehicle is covered by a grille. However, the grille must be provided with air inlet openings to allow for airflow. In this way, relatively cool atmospheric air can pass through the grille openings into the engine space. Consequently, unobstructed air flow through the grille openings inhibits the potential for overheating the engine space. Thus, to maximize air flow, it becomes necessary for the grille openings to be substantially free of chaff and debris.

However, maintaining the grille air openings substantially unoccluded is often difficult, especially in agricultural applications. During typical harvesting conditions, the air in the field is usually saturated with debris particles, such as, dust, chaff, corn silks, etc. While larger-sized debris particles may be intercepted by the grille and readily brushed off or removed, smaller-sized debris particles capable of passing through the grille openings can eventually accumulate on engine parts or clog the radiator core. As is known in the art, a build-up of debris on the radiator core may require engine down-time to avoid potentially dangerous overheating.

Shutting down the operation of the agricultural vehicle to prevent engine overheating is not economically efficient. Generally, vehicular down-time translates into production loss. Furthermore, removing debris from a clogged radiator core is an expensive, laborious process that adds to the cost of maintaining these work vehicles. For example, often the only method for removing corn silks accumulated about the tubes and fins of the radiator core is by applying air or water pressure at the rear face of the radiator core. Obviously, this is a time-consuming, labor-intensive, costly task. Furthermore, most conventional agricultural vehicles provide a shelf or a frame at the bottom of the grille upon which dirt and chaff can accumulate and block airflow. The shelves or frames on these current configurations are often difficult to clean, thereby contributing to inefficient operation.

Thus, there is a need for an inexpensive screen that is usable in combination with conventional grille structures used in agricultural vehicles. Further, there is a need for a screen that inhibits the build-up of debris on the grille frame. Further still, there is a need for a screen that inhibits the passage of debris through the openings of conventional grilles. Even further still, there is a need for a screen that is easily cleaned periodically without the need of tools or disassembly, thereby minimizing maintenance costs and vehicular shutdown time.

SUMMARY OF THE INVENTION

The present invention relates to a work vehicle having a front end, a rear end, and first and second sides extending between the front end and the rear end. The work vehicle includes a grille screen supported at the front end of the work vehicle and a bumper supported at the front end of the work vehicle below the grille screen. The grille screen includes a plurality of convolutions having lower edges. The bumper has a top surface facing the lower edges of the convolutions. The top surface and the lower edges are spaced apart by a gap sized to permit accumulated dirt and chaff to be wiped off the top surface.

The present invention further relates to a mobile vehicle having a front end, a rear end, and first and second sides extending between the front end and the rear end. The mobile vehicle includes an engine, a screen, and a ledge. The engine is at least partially enclosed in a compartment. The compartment has a portion exposed to the natural elements of the outside environment. The screen is supported by the compartment on the vehicle and includes a plurality of convolutions having lower edges. The ledge is disposed on the vehicle at a close proximity below the screen. The ledge has a top surface facing the lower edges of the convolutions. The top surface and the lower edges are spaced apart by a gap sized to permit accumulated dirt and chaff to be wiped off the top surface.

The present invention also relates to a mobile vehicle having a front end, a rear end, and first and second sides extending between the front end and the rear end. The mobile vehicle includes an engine and a screen. The engine is at least partially enclosed in a compartment on the vehicle. The compartment has a portion exposed to the natural elements of the outside environment. The screen is supported by the compartment to at least partially cover the portion exposed to the natural elements. The screen includes a plurality of convolutions having lower edges.

In one preferred embodiment, the grille screen convolutions define intervening channels that provide a directed track on which the impacting debris can gravitationally move downwardly toward the corresponding lower edges. Since the lower edges have free ends, the impacting debris can eventually either fall directly on the ground or onto the top surface of the bumper disposed below the grille screen. Any debris remaining adhered to the screen convolutions, or to the channels defined thereby, can be easily wiped off or removed by the user's hand. Similarly, the gap between the free ends of the lower edges of the screen convolutions and the top surface of the bumper is sufficient enough to allow the user to extend a hand therethrough and wipe off any debris accumulated on the top surface of the bumper. Such simple yet cost-effective cleaning takes only a few minutes to accomplish and requires no engine shutdown or parts removal.

BRIEF DESCRIPTION OF THE DRAWINGS

The invention will be described with further reference to the accompanying drawings, wherein like numerals denote like element and:

FIG. 1 is a perspective view of an agricultural vehicle, including the grille screen disposed on the front end of the vehicle.

FIG. 2 is an enlarged, fragmentary perspective view of the front end of the vehicle illustrated in FIG. 1, showing the convolutions on the grille screen above the bumper.

DETAILED DESCRIPTION OF THE PREFERRED EMBODIMENT

Figure 3:
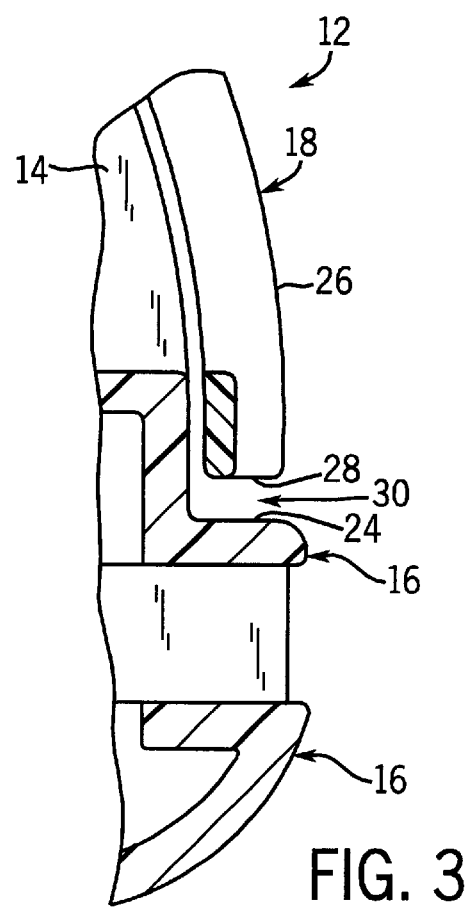
FIG. 3 is an enlarged, fragmentary, cross-sectional view of the front end illustrated in FIGS. 1 and 2, taken generally along lines 3—3 of FIG. 1.

With reference to FIG. 1, an agricultural vehicle 10, such as a tractor, is shown. Vehicle 10 is typically used for planting, tillage and harvesting agricultural fields. Vehicle 10 includes a front end 12 having a grille 14 and a bumper 16. The width of bumper 16 substantially extends the width of front end 12 of vehicle 10. The width of grille 14 is similar to the width of bumper 16. Grille 14 is mostly covered by a grille screen 18.

As shown in FIG. 2, bumper 16 includes lights 20 and 22 and a top surface 24. Top surface 24 of bumper 16 is disposed in relatively close proximity below screen 18 and is preferably configured to be substantially horizontal. Alternatively, bumper 16 and, thus, its top surface 24, may have other geometrical configurations (e.g., V-shaped bumper).

Screen 18 includes a plurality of convolutions 26 having lower edges 28. In the preferred embodiment, top surface 24 of bumper 16 faces lower edges 28 of convolutions 26. Even further, convolutions 26 of screen 18 are configured to be substantially transverse to top surface 24 of bumper 16, for whatever geometrical configuration bumper 16 may have. In particular, lower edges 28 of convolutions 26 of screen 18 are configured to complementarily follow in a transverse orientation the contour of top surface 24 of bumper 16.

Moreover, as illustrated in the cross-sectional view of front end 12 in FIG. 3, a gap 30 separates lower edges 28 of convolutions 26 from top surface 24 of bumper 16. The gap distance between lower edges 28 of convolutions 26 and top surface 24 of bumper 16 is preferably 0.5 inches and optimally at least 0.75 inches. Alternatively, gap 30 can have any dimension sufficient to allow a user's hand or a wiping utensil to extend therethrough.

Grille screen 18 is formed from a resilient, light-weight metal, such as steel. Alternatively, screen 18 may be formed from resilient, heat-resistant polymers or other materials. Screen 18 is preferably hinged along one side to grille 14 and latched on the other side to grille 14. Alternatively, screen 18 can be readily affixed to grille 14 by bolting the lateral edges of screen 18 to corresponding sides of the frame of grille 14, by releasably engaging the lateral edges of screen 18 in a complementary arrangement with corresponding sides of the grille frame, or by any other releasably-affixing means.

Figure 4:
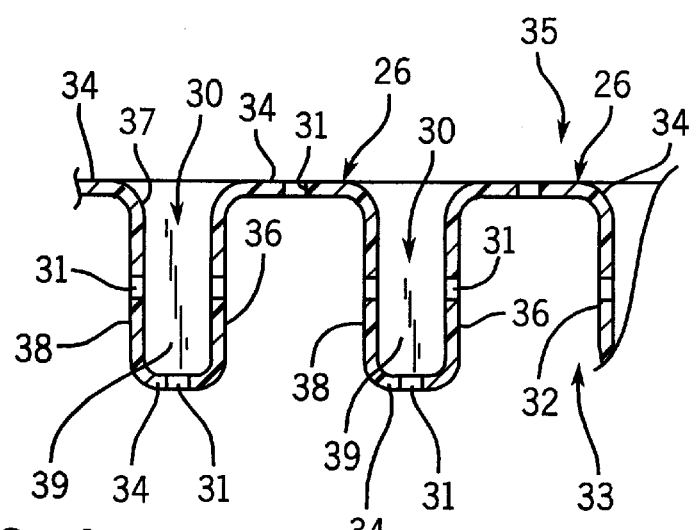
FIG. 4 is an enlarged, fragmentary, cross-sectional view of the grille screen illustrated in FIGS. 1 and 2, taken generally along lines 4—4 of FIG. 2.

As best shown by FIG. 4, screen 18 includes perforations 31 extending through screen 18 from a front face 33 to a rear face 35 of screen 18. Perforations allow air flow to grille 14. However, perforations 31 on screen 18 are dimensioned to restrict passage of smaller-sized environmental debris, such as, dust particles, chaff, or corn silks. In this way, screen 18 maintains unoccluded air flow through the perforations 31 for cooling. As will be appreciated, the size and density of perforations 31 will vary depending upon the amount of cooling necessary and the anticipated contaminant sizes in the work environment. Continuous, unobstructed air flow through the openings of grille 14 during the operation of vehicle 10 advantageously delays the potential for engine overheating. Furthermore, by inhibiting the passage of particulate debris through its perforations 31, screen 18 also minimizes the passage of such foreign material therethrough, which substantially contributes to maintaining engine parts and the radiator core clog-free. As a result, screen 18 serves to reduce maintenance costs, the frequency for engine or radiator parts replacement, and vehicular down-time.

As further illustrated by FIG. 4, convolutions 26 preferably have a rectangular cross section. Alternatively, convolutions 26 can have a rounder, more undulating cross section. Additionally, the plurality of convolutions 26 includes a series of intervening channels 32 and 37 extending along front face 33 and rear face 35, respectively. Each of channels 32 is defined by a base 34 and two oppositely-facing side walls 36 and 38 extending from base 34. In particular, base 34 of each of channels 32 connects two oppositely-facing lateral sides of adjacent convolutions 26 on screen 18. More specifically, side wall 36 of channel 32 is contributed by a lateral side of one convolution 26, whereas side wall 38 of the same channel 32 is contributed by the oppositely-facing lateral side of the adjacent convolution 26. Even further, channels 32 have open or free ends between lower edges 28, thereby, as shall be shown below, facilitating the cleaning of screen 18.

Each of channels 37 extends between opposing channels 32 and is closed or sealed by plug 39. Plug 39 comprises a generally flat imperforate occlusion member extending below channel 37 between lower edges 28 of screen 18. Plugs 39 preferably have a lower surface which is contiguous with edges 28. In the exemplary embodiment, plugs 39 are integrally formed as part of screen 18. Alternatively, plugs 39 may be mounted to screen 18 below channels 37. Because edges 28 are spaced from bumper 16 by gap 30, plugs 39 prevent dust, chaff, and other contaminants from flowing by screen 18 through channels 37.

Cleaning grille screen 18 is a simple, cost-effective process that requires no engine shut-down or parts removal. Intervening channels 32 between adjacent convolutions 26 on screen 18 provide a directed track on which the impacting debris can gravitationally move downwardly toward corresponding lower edges 28. Since channels 32 have open or free ends along edges 28, the impacting debris can ultimately either fall directly on the ground or onto top surface 24 of bumper 16, which is disposed below grille screen 18.

Any debris remaining adhered to convolutions 26 of screen 18, or to intervening channels 32, can be easily wiped off or removed by the user's hand. Similarly, gap 30 between the free ends of lower edges 28 and top surface 24 of bumper 16 is sufficiently spaced to allow the user to extend a hand or a wiping utensil therethrough and wipe off any debris accumulated on top surface 24 of bumper 16.

It is understood that the above description is of preferred exemplary embodiments of the present invention. For example, while vehicle 10 is preferably an agricultural work vehicle, the grille screen can also be applied to other vehicles, such as, construction vehicles, all-terrain (ATV) recreational vehicles, lawn-mowing tractors, etc. Also, in the preferred embodiment, vehicle 10 has a front bumper. However, vehicle 10 is not required to have a front bumper for the grille screen to inhibit clogging of the grille or engine compartment or to facilitate easy cleaning and maintenance. Further still, while dimensions were given for the gap between the lower edges of the screen convolutions and the top surface of the bumper on the front end of the vehicle, they are for illustration purposes only, and other dimensions can be used. Thus, various modifications may be made to the details of the disclosure without departing from the spirit of the invention, which is defined in the appended claims.

What is claimed is:

1. A work vehicle having a front end, a rear end, and first and second sides extending between the front end and the rear end, the work vehicle comprising:
   a grille screen supported at the front end of the work vehicle, the grille screen including a rear face, a front face, and an undulating cross-section providing a plurality of convolutions having lower edges, wherein the convolutions include front channels along the front face having open ends between the lower edges, wherein the convolutions include rear channels along the rear face, and wherein the channels each include a base and opposing sidewalls extending from the base;
   a plurality of plugs coupled to the screen so as to be carried by the screen, wherein the plurality of plugs occlude the rear channels at the lower edges; and
   a bumper supported at the front end of the work vehicle below the grille screen, wherein the bumper has a top surface facing the lower edges of the convolutions and wherein the top surface and the lower edges are spaced apart by a gap sized to permit accumulated dirt and chaff to be wiped off the top surface.

2. The vehicle of claim 1, wherein the gap between the lower edges of the screen and the top surface of the bumper is at least 0.5 inches.

3. The vehicle of claim 1, wherein the grille screen is perforated to allow air flow.

4. The vehicle of claim 1, wherein the bumper includes lights.

5. The vehicle of claim 1, wherein the convolutions have a generally rectangular cross section.

6. The vehicle of claim 1, wherein the top surface of the bumper is substantially horizontal.

7. The vehicle of claim 1, wherein the convolutions run generally transverse to the top surface of the bumper.

8. A work vehicle having a front end, a rear end, and first and second sides extending between the front end and the rear end, the work vehicle comprising:
   a frame;
   a plurality of ground engaging motive members coupled to the frame;
   a screen supported by the frame, the screen including a rear face, a front face and an undulating cross-section providing a plurality of convolutions having lower edges, wherein the convolutions include front channels along the front face having open ends between the lower edges, wherein the convolutions include rear channels along the rear face, and wherein the channels each include a base and opposing sidewalls extending from the base;
   a plurality of plugs coupled to the screen so as to be carried by the screen, wherein the plurality of plugs occlude the rear channels at the lower edges; and
   a ledge disposed on the vehicle at a close proximity below the screen, wherein the ledge has a top surface facing the lower edges of the convolutions and wherein the top surface and the lower edges are spaced apart by a gap sized to permit accumulated dirt and chaff to be wiped off the top surface.

9. The vehicle of claim 8, wherein the screen is perforated to allow air flow.

10. The vehicle of claim 8, wherein the convolutions have a generally rectangular cross section.

11. The vehicle of claim 8, wherein the top surface of the ledge is substantially horizontal.

12. The vehicle of claim 8, wherein the convolutions run generally perpendicular to the top surface of the ledge.

13. A work vehicle having a front end, a rear end, and first and second sides extending between the front end and the rear end, the work vehicle comprising:
   a frame;
   a plurality of ground engaging motive members coupled to the frame; and
   a screen supported by the compartment on the vehicle, the screen including a front face, a rear face and an undulating cross-section providing a plurality of convolutions having lower edges and front channels extending along the front face and rear channels extending along the rear face of the screen, wherein the front channels each include a base and opposing sidewalls extending from the base and wherein the front channels along the front face are open between the lower edges, and a plurality of plugs coupled to the screen so as to be carried by the screen, wherein the plurality of plugs occlude the rear channels at the lower edges.

14. The vehicle of claim 13, wherein the screen is perforated to allow air flow.

15. The vehicle of claim 13, wherein the convolutions have a generally rectangular cross section.

16. The vehicle of claim 13, wherein the convolutions run generally perpendicular to ground.

17. The vehicle of claim 1 wherein the plurality of plugs are integrally formed as part of a single unitary body with the screen.

18. The vehicle of claim 8 wherein the plurality of plugs are integrally formed as part of a single unitary body with the screen.

19. The vehicle of claim 13 wherein the plurality of plugs are integrally formed as part of a single unitary body with the screen.

* * * * *